July 11, 1961
T. F. KEEGAN
2,991,872
VIBRATORY CONVEYOR INERTIAL DRIVE
Filed Aug. 8, 1958
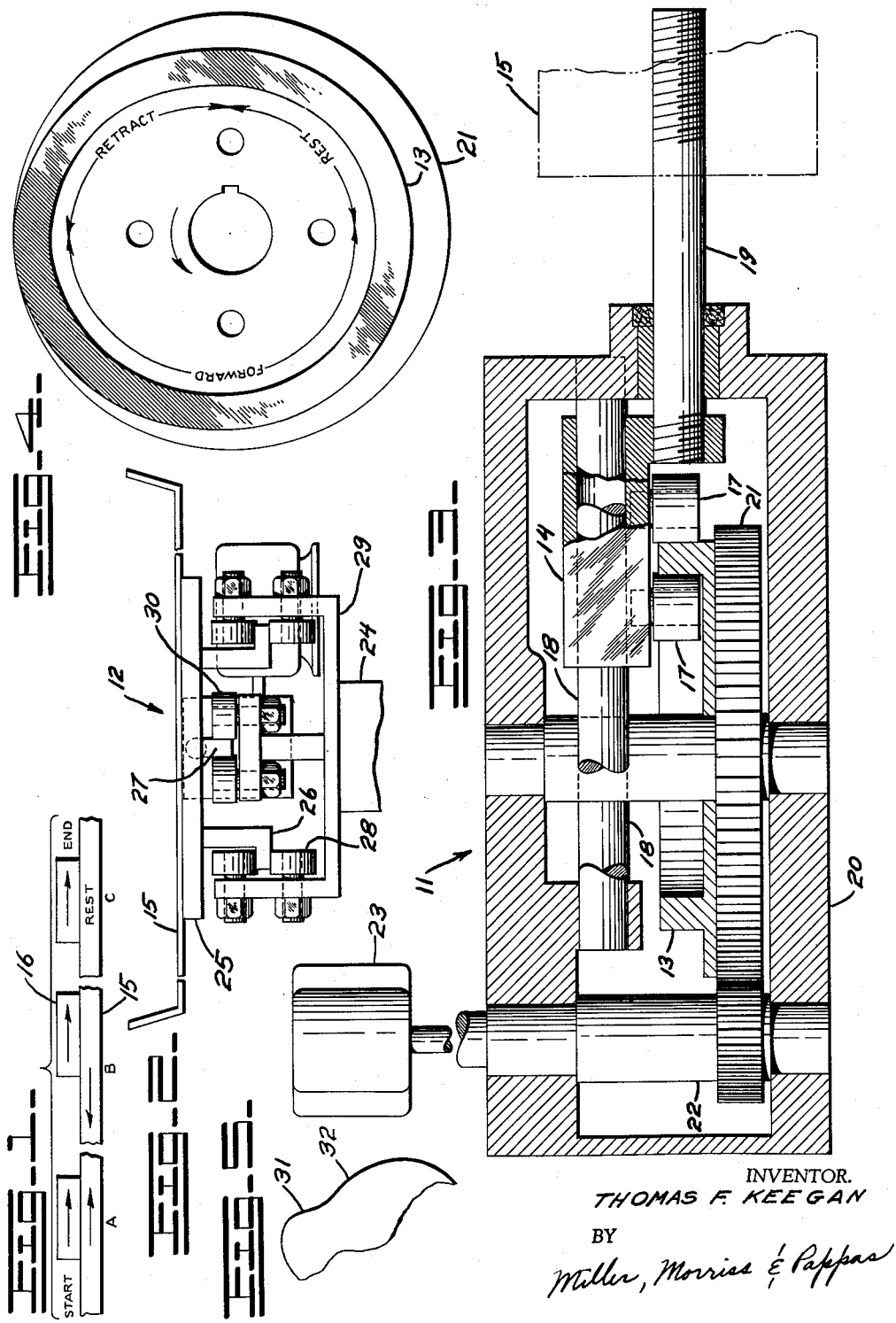
INVENTOR.
THOMAS F. KEEGAN
BY
Miller, Morriss & Pappas

2,991,872
VIBRATORY CONVEYOR INERTIAL DRIVE
Thomas F. Keegan, Lansing, Mich., assignor to Mathews Conveyer Company, Ellwood City, Pa., a corporation of Pennsylvania
Filed Aug. 8, 1958, Ser. No. 754,058
6 Claims. (Cl. 198—220)

This invention relates to a vibratory drive unit and conveyor system, and more particularly to a conveyor drive unit making optimum use of inertial forces in the material conveyed.

Vibratory drive units and conveyor systems are well known in the prior art. However, the conventionally designed equipment utilized in the prior art makes no advantageous use of the inertial forward movement of the material. In fact, the conventionally designed equipment in operation actually interrupts the inertial movement of the material being transported or conveyed.

Observations of the known devices of the prior art have indicated that the advance of material being conveyed is equal to or less than the actual stroke of the drive unit being utilized.

In the devices of the prior art, the cam control over oscillation provides a cycle consisting of an accelerating movement in a forward direction immediately followed by a quick traverse retraction. There was no use of a definite rest period during which the inertial force within the material being conveyed was allowed to cause the material to advance. It is, therefore, seen that in the conventionally designed equipment of the prior art, the movement resulting from the inertia imparted to the material is actually interrupted due to the effects of the coefficient of friction at work between the material and the conveyor surface.

It is, therefore, an object of this invention to provide a vibratory conveyor system which utilizes the inertial forces in the material being conveyed to achieve an advance in the material being conveyed which is substantially greater than the stroke of the drive unit.

A further object of this invention is to provide a drive unit and conveyor system which does not substantially counteract the inertial force of the material being conveyed.

A still further object of this invention is to provide a drive unit which exercises cam control over oscillation in order to produce an accelerating movement in a forward direction wherein the acceleration never disturbs the repose of the material on the conveyor surface.

Another object of this invention is to provide a drive unit utilizing positive-motion cam control over oscillation wherein the quick retracting movement is followed by a prolonged "dwell" permitting the imparted inertial force supplied by the acceleration to the material to exhaust itself in the forward sliding of the material before a new oscillatory cycle is begun.

Still another object of this invention is to provide a unique pedestal support and roller system for the conveyor surfaces utilized to convey the material.

Still another object is to provide a simple and compact mechanical oscillation imparting drive unit for conveyors in which the stroke is uniquely guided.

Yet another object of this invention is to provide a drive unit having an oscillatory cycle wherein the retraction phase is comprised by a quick retraction followed by a gradual retraction which merges into the rest phase.

A final object of this invention is to provide a simple trouble free structure capable of high production and economical maintenance.

Other objects and advantages found in the construction of my invention will be apparent from a consideration of the following specification in connection with the appended claims and the accompanying drawings.

In the drawings:

FIGURE 1 is a schematic view of the complete oscillatory cycle of the conveyor surface and illustrates the relative movement of the material being conveyed utilizing the inertia imparted to it to the fullest extent.

FIGURE 2 is a cross-sectional end view of the conveyor tray and pedestal support illustrating the downwardly depending guide fingers of the conveyor tray which engage the horizontally and vertically oriented guide rollers provided on the pedestal support.

FIGURE 3 is a top cross-sectional breakaway view of the drive unit illustrating the drive motor, the pinion drive shaft, the cam, the positive-motion cam follower rollers, the connecting arm which slides on dual guide rods, and the pusher rod which connects the conveyor tray to the drive unit.

FIGURE 4 is a top view of the raised cam utilized in the drive unit illustrating the configuration of the cam which imparts an oscillatory movement to the conveyor tray comprised of a forward acceleration phase, "a snap" retraction phase, and a "dwell" rest or idle phase.

FIGURE 5 is a diagram of the cam movement illustrating schematically the retraction phase of the oscillatory cycle wherein an initial quick retraction occurs followed by a gradual retraction which merges into the rest phase.

General description

In general a vibratory drive unit 11 is provided in conjunction with a roller mounted conveyor tray system 12. The drive unit 11 is provided with a cam 13 and cam follower connector 14 to provide oscillatory movement which will be described hereafter. The cam control is unique in that it provides a forward acceleration stroke which imparts accelerating movement in a forward direction to the conveyor bed or tray 15 and material 16 thereon. This accelerating movement is designed so that it does not disturb the repose of the material 16 being conveyed on the conveyor surface. The cam action is so designed that the gradual increasing accelerating forward movement is followed by a "snap" retraction phase which quickly retracts the conveyor surface from under the material. The snap retraction phase is comprised of a quick initial retraction of the conveyor followed by a gradual retraction which merges into the rest phase. This has been found to have the least effect on the inertial force which is acting upon the material. The "snap" retraction phase is followed by a "dwell" or rest phase permitting the inertial force imparted to the material being conveyed to exhaust itself by continuing forward movement of the material over the conveyor surface.

The positive-motion cam mechanism utilizes a cam follower connector 14 consisting of dual cam follower rollers 17. The rollers 17 are positioned to have contact on opposite faces of the raised cam 13. The dual rollers 17 are mounted upon a cam follower connector element 14 which has a rectilinear movement. The cam follower connector element 14 is mounted upon double guide rods 18 which provide great stability to the cam follower connector element 14. A pusher rod 19 connects the cam follower connector element 14 and the conveyor tray 15 so as to directly transmit the rectilinear movement of the cam follower connector 14 to the conveyor tray 15. It is thus seen that the use of the dual rollers 17 to follow the raised cam surface 13 and the use of double guide rods 18 to support the cam follower connector element 14 provides an inherently stable drive unit which imparts the desired oscillatory movement without the introduction of undesirable thrust.

It is within the scope of the invention to design the cam with a longer or shorter acceleration phase depending upon the coefficient of friction between the material being conveyed and the conveyor surface.

The "dwell" or rest phase may also be varied accordingly, depending upon the amount of time required to expend the inertial force of the moving material. This again is also dependent upon the coefficient of friction between the material and the conveyor surface. It will me appreciated that the mass of the material being conveyed also constitutes a design factor in any specific installation. It is thus seen that the incorporation of the "dwell" or rest phase directly after the "snap" retraction phase provides a unique drive unit which imparts a forward movement to material being conveyed substantially sufficient to provide enough inertia energy so that the movement of the material is in excess of the stroke amplitude of the drive unit. Observations of the instant invention indicate that a model utilizing a ¾ inch strike created approximately 1½ inches of forward movement in the material. The "dwell" or rest phase allows the material to move forward on the conveyor surface under the effect of its own inertia created during the accelerating portion of the cycle. This result is contrary to conventional oscillatory thought which does not provide a "dwell" or rest period for the conveyor surface in order to fully utilize the inertial forward movement of the material to provide a maximum travel of the material along the conveyor surface. The forward stroke of conventionally designed equipment is not specifically designed to consist of a gradually accelerating movement without disturbing the repose of the material being transported. This is intended to impart a maximum inertia to the material being conveyed.

The retraction phase of conventionally designed equipment generally is designed to overcome the frictional forces acting between the conveyor surface and the material being conveyed. No cam structure has heretofore been designed which has a specific snap retraction that not only overcomes the frictional forces acting between the conveyor surface and the material being conveyed, but is fast enough to have no appreciable effect on the inertia force of the forward moving material.

As stated previously, the "dwell" rest or idle phase allows the inertia force built up in the material being conveyed to exhaust itself by the continued forward movement of the material being conveyed. This, again, has not been found in the devices of the prior known art.

Thus it is seen that in the present invention the conveyor 15 and material 16 being conveyed move forward with an identical gradually accelerating movement (FIGURE 1A). In FIGURE 1B, the conveyor 15 is snap retracted in such a manner that the material 16 continues to move forward under the impetus of its inertial force. In FIGURE 1C, the conveyor 15 is at rest while the material 16 continues to move forward until the inertial force within it is exhausted.

It is thus seen that the claimed structure of the instant invention provides an unusual or unobvious result hitherto unknown in the prior art.

While the preferred embodiment of the invention utilizes a cam control to impart the unique oscilatory movement to the conveyor, it is within the scope of this invention to utilize any available or known means which is capable of imparting such movement to a conveyor.

*Specific description*

The drive unit 11 is provided with a raised cam 13 which imparts an oscillatory movement to a conveyor tray 15. The raised cam 13 shown in FIGURE 4, is designed to provide a forward gradually accelerating phase, a "snap" retraction phase and a "dwell" or rest phase. This oscillatory stroke cycle is shown schematically in FIGURE 1. The forward gradually accelerating phase, FIGURE 1A, is of such a degree that the repose of the material 16 being conveyed is not disturbed. Thus, no slippage or lost motion occurs. The "snap" retraction phase FIGURE 1B illustrates the conveyor 15 on its return stroke while the material 16 continues forward under the impetus of the inertial force created during the accelerating phase.

The "dwell" or rest phase, FIGURE 1C, constitutes an intentional and substantial portion of the oscillatory cycle. This "dwell" or rest phase is designed to take full advantage of the inertial forces built-up in the material 16 being conveyed. It is noted that the material 16 continues to move forward while the conveyor 15 is at rest. This forward movement continues until the inertial force is expended.

The cam follower assembly translates the rotational movement of the cam 13 into the rectilinear movement of the conveyor 15.

The cam follower assembly consists of two cam follower rollers 17 which are mounted upon a cam follower connector element 14. The rollers 17 are mounted on opposite sides of the raised cam 13, thus providing a positive-motion mechanism. This avoids the introduction of an undesirable thrust. The cam follower connector element 14 has a rectilinear movement and is mounted upon two vertically-oriented horizontal guide rods 18 which provide greater stability to the cam follower assembly. The cam follower connector element 14 is connected to a pusher rod 19 which in turn actuates the conveyor 15.

The cam wheel 21 is driven by the pinion drive shaft 22 mounted within the drive unit frame 20. The pinion drive shaft 22 may be powered by any suitable electric motor 23.

It must be remembered that for each specific job application, the acceleration, the "snap" retraction and the "dwell" or rest phases may be varied in proportion to each other in order to secure the most rapid advance of material along the conveyor surface utilizing to the fullest advantage the inertial force imparted to that material during the acceleration phase.

The conveyor surface generally consists of elongated conveyor tray sections 15 which may be varied in design for each particular job application. Each tray section 15 is mounted upon an adjustable pedestal support 24 which enables the conveyor surface to be varied in height as is necessary in order that this drive unit 11 and conveyor system may be incorporated in existing conveyor systems. The base 25 of each tray section 15 is provided with downwardly extending angle edge guides 26 and a central guide 27, as shown in FIGURE 2. The angle edge guides 26 engage pairs of vertical rollers 28 which are provided on a U frame 29. The U frame 29 has centrally mounted horizontal rollers 30 which engage the downwardly extending central guide 27 of the tray section 15. The U frame is mounted upon the adjustable pedestal support 24.

A highly versatile conveyor support assembly is thus provided which not only maintains directional control over the conveyor but is adapted to provide elevational control as well.

It is thus seen that a highly versatile drive unit and conveyor assembly is provided which is capable of moving material over a distance which substantially exceeds the actual stroke of the oscillatory means. The provision of an extended "dwell" or rest phase in the oscillatory cycle which fully utilizes the inertial force of the material being conveyed to increase the advance of the material has been found in actual test runs to substantially increase performance of the unit over the known devices of the prior art.

As shown in FIGURE 5, the retraction phase consists of a rapid retraction 31 followed by a gradual retraction 32. As stated previously this sequence is believed to provide the least resistance to the inertial forces in the material 16 being conveyed.

Various modifications of the invention may be made without departing from the principle thereof. Each of the modifications is to be considered as included in the hereinafter appended claims unless these claims by their language expressly provide otherwise.

Having thus set forth the nature of my invention, I claim the following:

1. In a conveyor using oscillatory motion for imparting unidirectional movement to materials, the combination including: a motor; oscillator means driven by said motor comprising drag, snap retraction, and dewll portions, the drag portion providing an accelerating forward motion kept beneath that speed which upsets the point of repose of material being conveyed, the retraction portion immediately following the drag portion operating as a snap return, and the dwell portion immediately following the retraction portion permitting full advantage of inertial force in the material being conveyed; a conveyor surface served by said drive; and a connection between said oscillator means and said conveyor surface.

2. In a conveyor using oscillatory motion for imparting unidirectional movement to materials, the combination including:

a motor; cam means driveably connected to said motor, said cam means providing three distinct phases during a single cycle, a forward drag phase establishing forward movement at an accelerating rate below that point at which the repose of material is disturbed; a snap retraction phase which returns the conveyor to its original position allowing the material being conveyed to continue forward under the effect of its inertial force, and a rest phase at the completion of the retraction phase which allows material to move forward until the inertial force therein has been fully expended; a conveyor surface; and a follower connection attached to said conveyor surface and responsive to the oscillatory cycling of said cam means.

3. In a conveyor using oscillatory motion for imparting unidirectional movement to material, the combination including: a motor; cam means driveably connected to said motor including three cyclic phases per revolution, the first being a forward accelerating drag approach, the second phase being a snap retraction, and a third idle phase; a served conveyor surface; and follower means translating the oscillatory action of said cam means to said served surface.

4. In a drive means as defined in claim 3 wherein the retraction portion of the cam means comprises a rapid retraction followed by gradual retraction which merges into the dwell portion.

5. In a conveyor using oscillatory motion for imparting unidirectional movement to materials, the combination including:

a motor; oscillator means driven by said motor comprising forward snap retraction and dwell portions, the forward portion providing an accelerating forward motion kept beneath that speed which upsets the point of repose of material being conveyed, the retraction portion immediately following the drag portion operating as a snap return, and the dwell portion immediately following the retraction portion permitting full advantage of inertial force in the material being conveyed; a conveyor surface served by said oscillator means; a connector between said oscillator means and said conveyor surface; and adjustable pedestal support means slidably engaging said conveyor surface.

6. In an oscillatory drive means for movement of material upon conveyors, the combination including: a motor; cam means driveably connected to said motor, said cam means providing three distinct phases during a single cycle, a forward drag phase establishing forward movement at an accelerating rate below that point at which the repose of material is disturbed, a snap retraction phase which allows the material being conveyed to continue forward under the effect of its inertial force, and a rest phase at the completion of the snap retraction phase which allows material to move forward until the inertial force therein has been fully expended; and cam follower connector means responsive to the oscillatory cycling of said cam means.

References Cited in the file of this patent

UNITED STATES PATENTS

| | | |
|---|---|---|
| 732,606 | Topliff | June 30, 1903 |
| 1,831,096 | Crawford et al. | Nov. 10, 1931 |
| 1,997,495 | Moore | Apr. 9, 1935 |
| 2,871,723 | Shephard | Feb. 3, 1959 |